(12) United States Patent
Veeningen

(10) Patent No.: US 11,836,273 B2
(45) Date of Patent: Dec. 5, 2023

(54) COMPUTER-IMPLEMENTED METHOD OF APPLYING A FIRST FUNCTION TO EACH DATA ELEMENT IN A DATA SET, AND A WORKER NODE FOR IMPLEMENTING THE SAME

(71) Applicant: KONINKLIJKE PHILIPS N.V., Eindhoven (NL)

(72) Inventor: Meilof Geert Veeningen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 440 days.

(21) Appl. No.: 16/955,102

(22) PCT Filed: Dec. 13, 2018

(86) PCT No.: PCT/EP2018/084654
§ 371 (c)(1),
(2) Date: Jun. 18, 2020

(87) PCT Pub. No.: WO2019/121271
PCT Pub. Date: Jun. 27, 2019

(65) Prior Publication Data
US 2021/0004494 A1    Jan. 7, 2021

Related U.S. Application Data

(60) Provisional application No. 62/609,450, filed on Dec. 22, 2017.

(51) Int. Cl.
G06F 21/64 (2013.01)
H04L 9/08 (2006.01)
G06F 21/62 (2013.01)

(52) U.S. Cl.
CPC .......... *G06F 21/64* (2013.01); *G06F 21/6254* (2013.01); *H04L 9/085* (2013.01); *H04L 2209/46* (2013.01)

(58) Field of Classification Search
CPC ..... G06F 21/64; G06F 21/6254; H04L 9/085; H04L 2209/46; H04L 9/008
See application file for complete search history.

(56) References Cited

U.S. PATENT DOCUMENTS 3,997,248 A    12/1976  Fujii et al.
9,143,161 B1    9/2015  Greene et al.
(Continued)

OTHER PUBLICATIONS

De Hoogh, S., "Design of large scale applications of secure multi-party computation: secure linear programming". PhD thesis, Eindhoven University of Technology, 2012.
(Continued)

*Primary Examiner* — Carl G Colin
*Assistant Examiner* — Andrew Suh

(57) ABSTRACT

There is provided a computer-implemented method of applying a first function to each data element in a first data set, the method comprising (i) determining whether each data element in the first data set satisfies a criterion, wherein the criterion is satisfied only if the result of applying the first function to the data element is equal to the result of applying a second first data set satisfies a criterion function to the data element; (ii) forming a compressed data set comprising the data elements in the first data set that do not satisfy the criterion; (iii) applying the first function to 10 each data element in the compressed data set; and (iv) forming an output based on the results of step (iii); wherein steps (i)-(iv) are performed using multiparty computation, MPC, techniques. A corresponding system and worker node are also provided.

23 Claims, 5 Drawing Sheets

(56) References Cited

U.S. PATENT DOCUMENTS

| | | | | |
|---|---|---|---|---|
| 10,396,984 | B2* | 8/2019 | French | G06Q 20/10 |
| 10,491,384 | B2* | 11/2019 | French | H04L 9/32 |
| 2009/0228316 | A1* | 9/2009 | Foley | G06Q 10/0635 |
| | | | | 705/7.28 |
| 2013/0291118 | A1* | 10/2013 | Li | G06F 21/6245 |
| | | | | 726/26 |
| 2016/0314140 | A1* | 10/2016 | Gupta | H03M 7/3079 |
| 2017/0269904 | A1* | 9/2017 | Takaya | H04L 9/0869 |
| 2018/0011130 | A1* | 1/2018 | Aguayo Gonzalez | H04L 9/003 |
| 2018/0101697 | A1* | 4/2018 | Rane | H04L 9/085 |
| 2020/0396056 | A1* | 12/2020 | Boesgaard | H03M 7/607 |

OTHER PUBLICATIONS

Bogdanov, D. et al., "High-performance secure multi-party computation for data mining applications", Int. J. Inf. Secur., 11(6):403-418, Nov. 2012.

De Hoogh, S. et al., "Universally verifiable outsourcing and application to linear programming", vol. 13 of Cryptology and Information Security Series, chapter 10, IOS Press, 2015.

FRESCO (the Framework for Efficient Secure Computation), https://github.com/aicis/fresco.

Schoenmakers, B. et al., "Trinocchio: Privacy-friendly outsourcing by distributed verifiable computation", International Association for Cryptologic Research, vol. 20160707: 135212, Jul. 7, 2016, pp. 1-33.

Veeningen, M., "Pinocchio-based adaptive zk-SNARKs and Secure/Correctly adaptive function evaluation", IACR, International Association for Cryptologic Research, vol. 20170621:074424, Jun. 21, 2017, pp. 1-29.

Zhicong, H. et al., "A privacy-preserving solution for compressed storage and selective retrieval of genomic data". Cold Spring Harbor Laboratory Press, ISSN 1088-9051/16. www.genome.org.

Zhu, Z., et al., "High-throughput DNA sequence data compression". Briefings in Bioinformatics., vol. 16, No. 1.1-15, 2013. doi:10.1093/bib/bbt087.

Damgard, I. et al., "Practical covertly secure MPC for dishonest majority—or: Breaking the SPDZ limits". Computer Security—ESORICS 2013—18th European Symposium on Research in Computer Security, Egham, UK, Sep. 9-13, 2013, Proceedings, pp. 1-18, 2013.

Damgard, I. et al., "Multiparty Computation from Somewhat Homomorphic Encryption". In R. Safavi-Naini and R. Canetti, editors, Advances in Cryptology—CRYPTO 2012, vol. 7417 of Lecture Notes in Computer Science, pp. 643-662. Springer Berlin Heidelberg, 2012.

Keller, M. et al., "MASCOT: faster malicious arithmetic secure computation with oblivious transfer". IACR Cryptology ePrint Archive, 2016:505, 2016.

International Search Report for PCT/EP2018/084654 dated Dec. 13, 2018.

\* cited by examiner

COMPUTER-IMPLEMENTED METHOD OF APPLYING A FIRST FUNCTION TO EACH DATA ELEMENT IN A DATA SET, AND A WORKER NODE FOR IMPLEMENTING THE SAME

CROSS-REFERENCE TO PRIOR APPLICATIONS

This application is the U.S. National Phase application under 35 U.S.C. § 371 of International Application No. PCT/EP2018/084654, filed on Dec. 13, 2018, which claims the benefit of U.S. Patent Application No. 62/609,450, filed on Dec. 22, 2017. These applications are hereby incorporated by reference herein.

FIELD OF THE INVENTION

The disclosure relates to the application of a first function to each data element in a data set, and in particular to a computer-implemented method and a worker node for applying a first function to each data element in a data set.

BACKGROUND OF THE INVENTION

In settings where sensitive information from multiple mutually distrusting parties needs to be processed, cryptography-based privacy-preserving techniques such as multiparty computation (MPC) can be used. In particular, when using MPC, sensitive data is "secret shared" between multiple parties so that no individual party can learn the data without the help of other parties. Using cryptographic protocols between these parties, it is possible to perform computations on such "secret shared" data. Although a wide range of primitive operations on secret shared data are available, not all traditional programming language constructs are available. For instance, it is not possible to have an "if" statement with a condition involving a sensitive variable, simply because no party in the system should know whether the condition holds. Hence, efficient methods to perform higher-level operations (e.g., sorting a list or finding its maximum) are needed that make use only of operations available on secret-shared data.

One common operation occurring in information processing is the "map" operation, where the same function $f$ is applied to all elements in a data set.

SUMMARY OF THE INVENTION

One way to perform the "map" operation on secret-shared data, is to apply a function $f$ under MPC to the secret shares of each data element in the data set. However, suppose a function $f$ is to be mapped to a data set for which:
  it is computationally expensive to compute function $f$ on input x using MPC;
  there is criterion $\phi$ that is straightforward to check on input x such that, if it is true, $f(x)=g(x)$ where function g is straightforward to compute (e.g., it is a constant); and
  it is known that $\phi$ holds for a large part of the data set.

If privacy of the data is not an issue, then the time taken for the "map" operation could be reduced by applying g instead of $f$ on data elements for which $\phi$ holds. Translated to the MPC setting, this would mean that, for each data element x of the data set, it is checked if $\phi$ holds using MPC; and if $\phi$ holds then g is executed on x using MPC; and otherwise $f$ is executed on x using MPC. However, this would leak information about x since, to be able to branch on $\phi(x)$, it would be necessary to reveal whether or not $\phi(x)$ is true.

There is therefore a need for an improved technique for applying a first function to each data element in a data set that addresses one or more of the above issues.

The techniques described herein provide that a function $f$ can be mapped on to a data set in the above setting, which avoids having to apply $f$ to all data elements in the data set and does not leak the value of criterion $\phi$. Embodiments provide that a function $f$ can be mapped on to a data set such that $f$ needs to be executed on a data element in the data set under MPC at most N times, where N is a known upper bound on the number of data elements not satisfying $\phi$. To obtain this improvement, the techniques described herein provide that g is executed on all data elements of the data set, and a "compression" operation is performed, with an output formed from the result of the compression. Although these steps introduce additional computation effort, if $f$ is complicated enough then the savings of avoiding computation of $f$ on some of the data elements in the data set outweigh these additional costs, leading to an overall performance improvement.

According to a first specific aspect, there is provided a computer-implemented method of applying a first function to each data element in a first data set, the method comprising (i) determining whether each data element in the first data set satisfies a criterion, wherein the criterion is satisfied only if the result of applying the first function to the data element is equal to the result of applying a second function to the data element; (ii) forming a compressed data set comprising the data elements in the first data set that do not satisfy the criterion; (iii) applying the first function to each data element in the compressed data set; and (iv) forming an output based on the results of step (iii); wherein steps (i)-(iv) are performed using multiparty computation, MPC, techniques.

According to a second aspect, there is provided a worker node for use in the method according to the first aspect.

According to a third aspect, there is provided a system for applying a first function to each data element in a first data set, the system comprising a plurality of worker nodes, wherein the plurality of worker nodes are configured to use multiparty computation, MPC, techniques to determine whether each data element in the first data set satisfies a criterion, wherein the criterion is satisfied only if the result of applying the first function to the data element is equal to the result of applying a second function to the data element; form a compressed data set comprising the data elements in the first data set that do not satisfy the criterion; apply the first function to each data element in the compressed data set; and form an output based on the results of applying the first function to each data element in the compressed data set.

According to a fourth aspect, there is provided a worker node configured for use in the system according to the third aspect.

According to a fifth aspect, there is provided a worker node for use in applying a first function to each data element in a first data set, wherein the worker node is configured to use one or more multiparty computation, MPC, techniques with at least one other worker node to determine whether each data element in the first data set satisfies a criterion, wherein the criterion is satisfied only if the result of applying the first function to the data element is equal to the result of applying a second function to the data element; form a compressed data set comprising the data elements in the first data set that do not satisfy the criterion; apply the first function to each data element in the compressed data set; and form an output based on the result of applying the first function to each data element in the compressed data set.

According to a sixth aspect, there is provided a computer-implemented method of operating a worker node to apply a first function to each data element in a first data set, the method comprising (i) determining whether each data element in the first data set satisfies a criterion, wherein the criterion is satisfied only if the result of applying the first function to the data element is equal to the result of applying a second function to the data element; (ii) forming a compressed data set comprising the data elements in the first data set that do not satisfy the criterion; (iii) applying the first function to each data element in the compressed data set; and (iv) forming an output based on the results of step (iii); wherein steps (i)-(iv) are performed using multiparty computation, MPC, techniques with one or more other worker nodes.

According to a seventh aspect, there is provided a computer program product comprising a computer readable medium having computer readable code embodied therein, the computer readable code being configured such that, on execution by a suitable computer or processor, the computer or processor is caused to perform the method according to the first aspect or the sixth aspect.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

Figure 1:
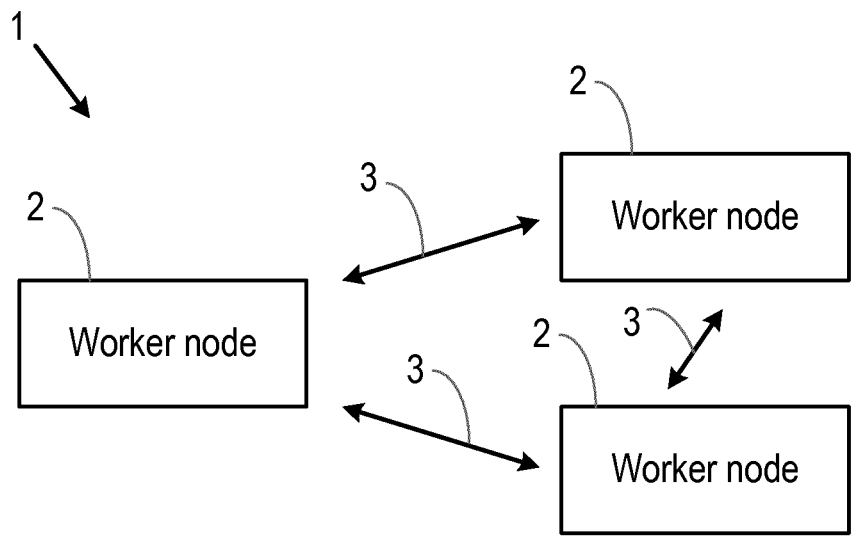
FIG. 1 is a block diagram of a system comprising a plurality of worker nodes according to an embodiment of the techniques described herein.

FIG. 1 is a block diagram of a system 1 in which the techniques and principles described herein may be implemented. The system 1 comprises a plurality of worker nodes 2, with three worker nodes 2 being shown in FIG. 1. Each worker node 2 is able to participate in multiparty computations (MPCs), with one or more of the other worker nodes 2. Multiparty computation techniques allows the computation of a joint function on sensitive (private) inputs from mutually distrusting parties without requiring those parties to disclose these inputs to a trusted third party or to each other (thus preserving the privacy of these inputs). Cryptographic protocols ensure that no participating party (or coalition of parties) learns anything from this computation except its intended part of the computation outcome. In the system shown in FIG. 1, an input for the computation can be provided by one or more worker nodes 2 and/or by one or more input nodes (not shown in FIG. 1). The output of the computation may be returned to the node that provided the input(s), e.g. one or more worker nodes 2 and/or one or more input nodes, and/or the output can be provided to one or more nodes that did not provide an input, e.g. one or more of the other worker nodes 2 and/or one or more output nodes (not shown in FIG. 1). Often, a recipient of the output of the MPC is a node that requested the computation.

The plurality of worker nodes 2 in FIG. 1 can be considered as a "committee" of worker nodes 2 that can perform an MPC. A single committee may perform the whole MPC, but in some cases multiple committees (comprising a respective plurality of worker nodes 2) can perform respective parts of the MPC.

The worker nodes 2 are interconnected and thus can exchange signalling therebetween (shown as signals 3). The worker nodes 2 may be local to each other, or one or more of the worker nodes 2 may be remote from the other worker nodes 2. In that case, the worker nodes 2 may be interconnected via one or more wireless or wired networks, including the Internet and a local area network.

Each worker node 2 can be any type of electronic device or computing device. For example a worker node 2 can be, or be part of any suitable type of electronic device or computing device, such as a server, computer, laptop, smart phone, etc. It will be appreciated that the worker nodes 2 shown in FIG. 1 do not need to be the same type of device, and for example, one or more worker nodes 2 can be servers, one or more worker nodes 2 can be a desktop computer, etc.

Figure 2:
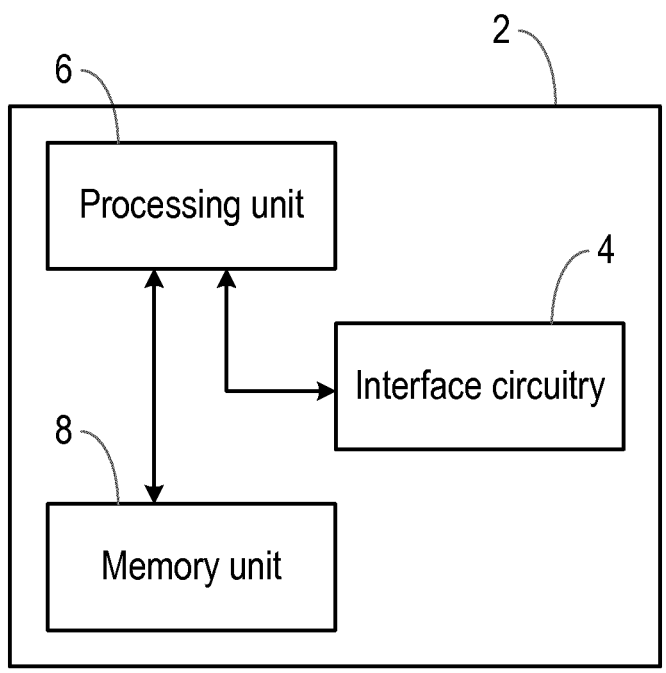
FIG. 2 is a block diagram of a worker node that can be used in embodiments of the techniques described herein.

FIG. 2 is a block diagram of an exemplary worker node 2. The worker node 4 includes interface circuitry 4 for enabling a data connection to other devices or nodes, such as other worker nodes 2. In particular the interface circuitry 4 can enable a connection between the worker node 2 and a network, such as the Internet or a local area network, via any desirable wired or wireless communication protocol. The worker node 2 further includes a processing unit 6 for performing operations on data and for generally controlling the operation of the worker node 2. The worker node 2 further includes a memory unit 8 for storing any data required for the execution of the techniques described herein and for storing computer program code for causing the processing unit 6 to perform method steps as described in more detail below.

The processing unit 6 can be implemented in numerous ways, with software and/or hardware, to perform the various functions described herein. The processing unit 6 may comprise one or more microprocessors or digital signal processor (DSPs) that may be programmed using software or computer program code to perform the required functions and/or to control components of the processing unit 10 to effect the required functions. The processing unit 6 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The memory unit 8 can comprise any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM), and electrically erasable PROM (EEPROM).

If a worker node 2 stores or holds one or more data sets that can be processed in a multiparty computation, the data set(s) can be stored in the memory unit 8.

As noted above, one common operation occurring in information processing is the map operation, where the same function $f$ is applied to all data elements in a data set. However applying function $f$ can be computationally expensive, particularly where the data set is secret/private and the function $f$ has to be applied under MPC to each individual data element.

For some functions $f$, there can be a criterion $\phi$ that is straightforward to check on input (data element) x such that, if it is true, $f(x)=g(x)$ where function g is straightforward to compute (e.g., it is a constant), which means that the time taken for the map operation could be reduced by applying g instead of $f$ on data elements for which $\phi$ holds. This can mean that, for each data element x of the data set, it is checked if $\phi$ holds using MPC; and if $\phi$ holds then g is executed on x using MPC; and otherwise $f$ is executed on x using MPC. However, this would leak information about x since, to be able to branch on $\phi(x)$, it would be necessary to reveal whether or not $\phi(x)$ is true.

Thus, techniques are required whose program flow does not depend on sensitive data to respect the sensitivity of data elements in the data set. The techniques described herein provide improvements to the application of a function $f$ to a data set that is secret or private to one or more parties, where there is criterion $\phi$ for function $f$ as described above, that means that function $f$ does not need to be applied to all data elements in the data set.

Figure 3:
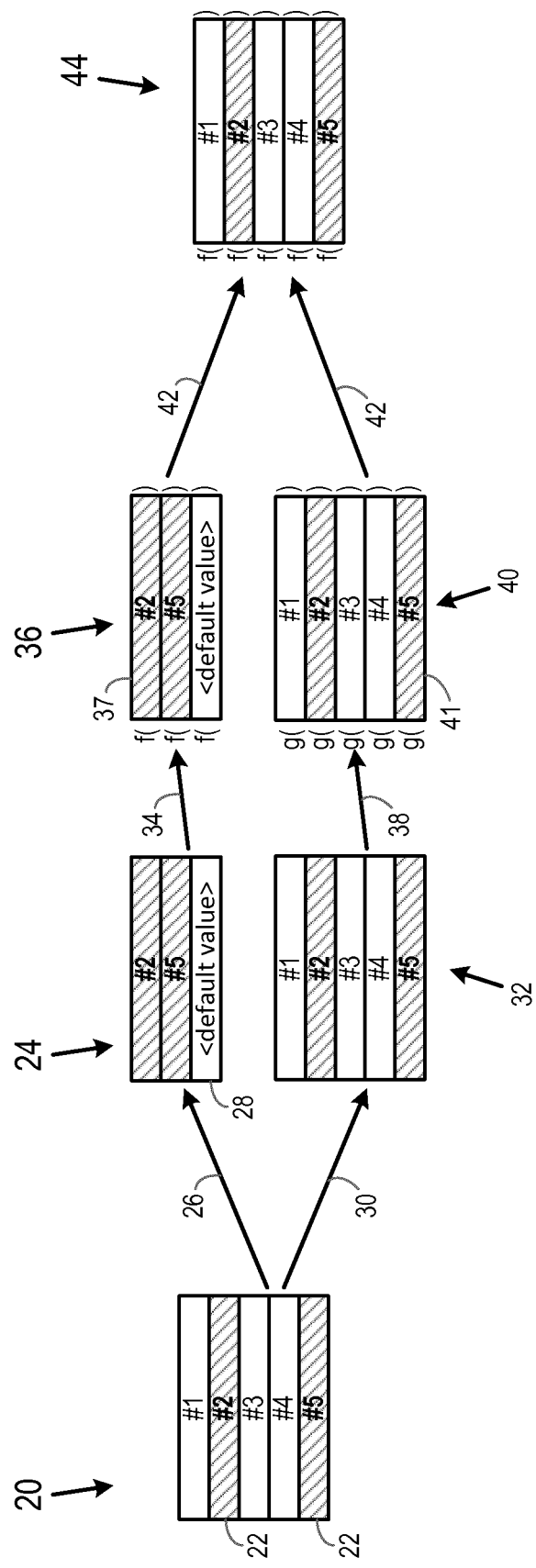
FIG. 3 is a diagram illustrating a so-called filtered map procedure according to an embodiment of the techniques described herein.

A first embodiment of the techniques presented herein is described with reference to FIG. 3 that illustrates a map operation on a data set 20 that comprises a plurality of data elements 22. This first embodiment is also referred to as a 'filtered map' operation herein. It will be appreciated that although FIG. 3 shows the data set 20 as having five data elements 22, the data set 20 may comprise less data elements 22, or typically many more than five data elements 22. The data elements 22 are numbered consecutively in FIG. 3 from #1 to #5 for ease of identification.

Firstly, for all data elements 22 in the data set 20, it is checked whether $\phi$ is satisfied. This check is performed using MPC techniques. That is, the check is performed by two or more worker nodes 2 using MPC techniques so that no individual worker node 2 learns the content of a data element 22 or learns whether a particular data element 22 satisfies $\phi$. As noted above, $\phi$ is satisfied only if $f(x)=g(x)$, i.e. $\phi$ is satisfied only if the result of applying function $f$ to data element x is the same as the result of applying function g to data element x. An example of a check of a criterion $\phi$ is described below with reference to Algorithm 5.

In FIG. 3, the data elements 22 that are found to satisfy $\phi$ are shown in clear boxes and the data elements 22 that are found not to satisfy $\phi$ are shown in cross-hatched boxes. It will be appreciated that FIG. 3 shows this distinction between the data elements 22 for ease of understanding only, and no individual worker node 2 knows which data elements 22 satisfy/do not satisfy $\phi$. In the example of FIG. 3, data elements #2 and #5 are found not to satisfy the criterion $\phi$. Data elements #1, #3 and #4 are found to satisfy the criterion $\phi$.

Given an upper bound N on the number of data elements 22 that do not satisfy $\phi$, the data set 20 is compressed into a compressed data set 24 having N data elements 22 by compression operation 26. The compression operation 26 takes the data elements 22 in data set 20 that do not satisfy the criterion $\phi$ into a compressed data set 24, along with one or more data elements corresponding to default values 28 if the upper bound is not met (i.e. if the number of data elements 22 that do not satisfy $\phi$ is less than N) to make a N-size compressed data set 24. A technique for performing this compression is set out in more detail below. The default values 28 can be random data elements that are in the domain of $f$. Alternatively, the default values 28 can be data elements 22 in the data set 20 that do satisfy the criterion $\phi$. The compression operation 26 is performed using MPC techniques by two or more worker nodes 2 so that no individual worker node 2 learns the values of the data elements 22, which data elements 22 of data set 20 become part of the compressed data set 24 and which data elements in the compressed data set 24 correspond to the default value(s) 28. The worker nodes 2 that perform the compression operation 26 may be the same or different to the worker nodes 2 that perform the check of the criterion $\phi$.

In the example of FIG. 3, the compression operation 26 takes data elements #2 and #5 into the compressed data set 24.

FIG. 3 also shows a copy operation 30 that copies the data set 20 to form a copied data set 32 that is identical to the data set 20. It will be appreciated that in practice this copy operation 30 may not need to be performed if the compression operation 26 copies the data elements 22 in data set 20 that do not satisfy the criterion $\phi$ into the compressed data set 24.

Function $f$ is applied to all elements (i.e. the data elements that do not satisfy $\phi$ and the one or more default values 28) of the compressed data set 24. This is shown by the map operation 34 and results in a compressed $f$-mapped data set 36 having $f$-mapped data elements 37. The application of the function $f$ to the elements in compressed data set 24 is performed using MPC techniques by two or more worker nodes 2 so that no individual worker node 2 learns the values of the data elements 22 in the compressed data set 24, or the result of applying the function $f$ to any data element 22 (including the default value(s) 28). The worker nodes 2 that perform the $f$-mapping operation 34 may be the same or different to the worker nodes 2 that perform the check and/or compression operation 26.

In the example of FIG. 3, the $f$-mapping operation 34 applies function $f$ to data elements #2 and #5.

Function g is applied to all elements 22 of the copied data set 32 (or original data set 20). This is shown by the map operation 38 and results in g-mapped data set 40 having g-mapped data elements 41. The application of the function g to the elements in copied data set 32 is performed using MPC techniques by two or more worker node 2 so that no individual worker node 2 learns the values of the data elements 22 in the data set 20/copied data set 32, or the result of applying the function g to any data element 22. The worker nodes 2 that perform the g-mapping operation 38 may be the same or different to the worker nodes 2 that perform the check, the compression operation 26 and/or the $f$-mapping operation 34.

In the example of FIG. 3, the g-mapping operation 38 applies function g to all data elements #1 to #5.

After the mapping operations 34, 38, the compressed ƒ-mapped data set 36 is decompressed by decompression operation 42 into a ƒ-mapped data set 44 having the same size (i.e. same number of data elements) as data set 20. In particular, the ƒ-mapped data elements 37 corresponding to the data elements 22 for which the criterion ϕ was not satisfied are placed into the ƒ-mapped data set 44 in the locations corresponding to the locations of the respective data elements in the data set 20, with the relevant g-mapped data elements 41 included in the ƒ-mapped data set 44 for any data element 22 in the data set 20 for which the criterion ϕ was satisfied. Thus, the ƒ-mapped data set 44 includes the ƒ-mapped data elements 37 and some of the g-mapped data elements 41. A technique for performing this decompression is set out in more detail below. In the embodiments above where the default value(s) 28 are some of the data elements 22 in the data set 20 that do satisfy the criterion ϕ, for those data elements 22 that were used as default values 28, the decompression operation 42 can comprise taking either the ƒ-mapped versions of those data elements 22 in the compressed ƒ-mapped data set 36 into the ƒ-mapped data set 44 or the g-mapped versions of those data elements 22 in the g-mapped dataset into the ƒ-mapped data set 44 (and it will be appreciated that it does not matter which of the sets 36, 40 provides these elements as they are the same.

The decompression operation 42 is performed using MPC techniques by two or more worker nodes 2 so that no individual worker node 2 learns the values of the ƒ-mapped data elements 37, the g-mapped data elements 41, which ƒ-mapped data elements 37 decompress to which locations in the ƒ-mapped data set 44, which g-mapped data elements 41 decompress to which locations in the ƒ-mapped data set 44, or the content of the ƒ-mapped data set 44. The worker nodes 2 that perform the decompression operation 42 may be the same or different to the worker nodes 2 that perform the check, the compression operation 26, the ƒ-mapping operation 34 and/or the g-mapping operation 38.

In the example of FIG. 3, the ƒ-mapped data elements #2 and #5 are decompressed to locations in ƒ-mapped data set 44 corresponding to the locations of data elements #2 and #5 in data set 20, and g-mapped data elements #1, #3 and #4 are decompressed to locations in ƒ-mapped data set 44 corresponding to the locations of data elements #1, #3 and #4 in data set 20.

It will be noted that in the ƒ-mapped data set 44, each mapped data element was obtained either by directly computing ƒ of that data element 22 in data set 20, or by computing g of that data element 22 if ϕ was satisfied. Thus, based on the definition of criterion ϕ, the end result of the technique shown in FIG. 3 is the application of function ƒ to all data elements 22 in the original data set 20.

A second embodiment of the techniques presented herein relates to a so-called map-reduce operation on a data set. In a map-reduce operation/computation, the task is to compute $f(x_1) \oplus \ldots \oplus f(x_n)$ where $\oplus$ is an associative operator (e.g. addition) and $f(x_i)$ is equal to a neutral element of the associative operator (e.g. zero in the case of addition) whenever the criterion ϕ is satisfied. In this second embodiment, by comparison to the first embodiment above, a decompression operation is not necessary, and a 'reduce' operation can be performed directly on the compressed ƒ-mapped data set to produce the output.

Figure 4:
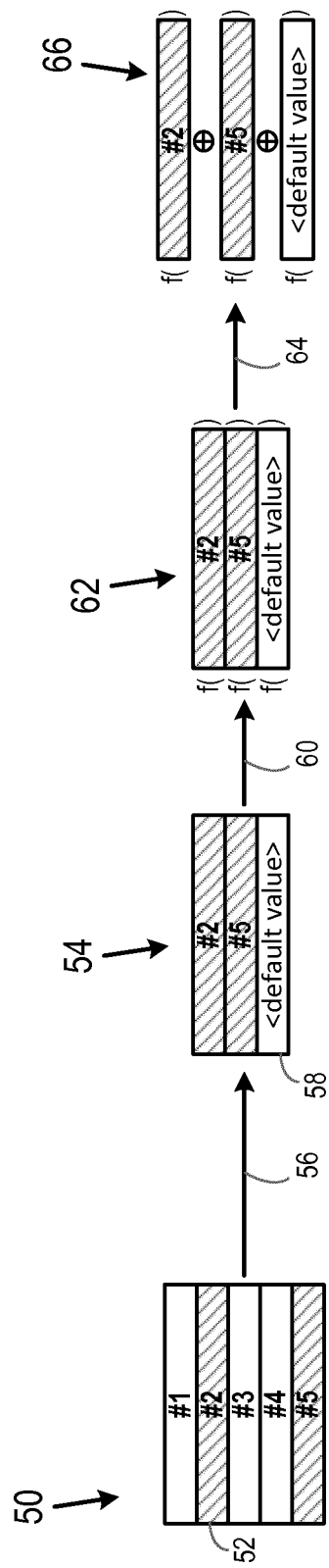
FIG. 4 is a diagram illustrating a so-called filtered map-reduce procedure according to an embodiment of the techniques described herein.

The second embodiment is described below with reference to FIG. 4 which shows a data set 50 that comprises a plurality of data elements 52. It will be appreciated that although FIG. 4 shows the data set 50 as having five data elements 52, the data set 50 may comprise less data elements 52, or typically many more than five data elements 52. The data elements 52 are numbered consecutively in FIG. 4 from #1 to #5 for ease of identification.

Firstly, for all data elements 52 in the data set 50, it is checked whether ϕ is satisfied. This check is performed using MPC techniques. That is, the check is performed by two or more worker nodes 2 using MPC techniques so that no individual worker node 2 learns the content of a data element 52 or learns whether a particular data element 52 satisfies ϕ. As noted above, ϕ is satisfied only if $f(x)=g(x)=$ neutral operator for $\oplus$, i.e. ϕ is satisfied only if the result of applying function ƒ to data element x is a neutral operator for $\oplus$ (i.e. the result of applying function ƒ to data element x produces a result that does not contribute to the output of the overall map-reduce operation.

In FIG. 4, the data elements 52 that are found to satisfy ϕ are shown in clear boxes and the data elements 52 that are found not to satisfy ϕ are shown in cross-hatched boxes. It will be appreciated that FIG. 4 shows this distinction between the data elements 52 for ease of understanding only, and no individual worker node 2 knows which data elements 52 satisfy/do not satisfy ϕ. In the example of FIG. 4, data elements #2 and #5 are found not to satisfy the criterion ϕ. Data elements #1, #3 and #4 are found to satisfy the criterion ϕ.

Given an upper bound N on the number of data elements 52 that do not satisfy ϕ, the data set 50 is compressed into a compressed data set 54 having N data elements 52 by compression operation 56. The compression operation 56 takes the data elements 52 in data set 50 that do not satisfy the criterion ϕ into a compressed data set 54, along with one or more data elements corresponding to default values 58 if the upper bound is not met (i.e. if the number of data elements 52 that do not satisfy ϕ is less than N) to make a N-size compressed data set 54. In this embodiment, the default value(s) 58 are such that the result of applying function ƒ to the default value(s) is a neutral element of the associative operator $\oplus$. As in the first embodiment, the default value(s) can be random data elements that are in the domain of ƒ, or they can be data elements 52 in the data set 50 that do satisfy the criterion ϕ. A technique for performing this compression operation 56 is set out in more detail below. The compression operation 56 is performed using MPC techniques by two or more worker nodes 2 so that no individual worker node 2 learns the values of the data elements 52, which data elements 52 of data set 50 become part of the compressed data set 54 and which data elements in the compressed data set 54 correspond to the default value(s) 58. The worker nodes 2 that perform the compression operation 56 may be the same or different to the worker nodes 2 that perform the check of the criterion ϕ.

In the example of FIG. 4, the compression operation 56 takes data elements #2 and #5 into the compressed data set 54.

Function ƒ is applied to all elements (i.e. the data elements that do not satisfy ϕ and the one or more default values 58) of the compressed data set 54. This is shown by the map operation 60 and results in a compressed ƒ-mapped data set 62 having ƒ-mapped data elements. The application of the function ƒ to the elements in compressed data set 34 is performed using MPC techniques by two or more worker nodes 2 so that no individual worker node 2 learns the values of the data elements 52 in the compressed data set 54, or the result of applying the function ƒ to any data element 52 (including the default value(s) 58). The worker nodes 2 that perform the $f$-mapping operation 60 may be the same or different to the worker nodes 2 that perform the check and/or compression operation 56.

In the example of FIG. 3, the $f$-mapping operation 60 applies function $f$ to data elements #2 and #5.

After the mapping operation 60, the compressed $f$-mapped data set 62 is reduced by reduce operation 64 using operator $\oplus$. That is, the $f$-mapped data elements in $f$-mapped data set 62 (i.e. corresponding to the data elements 52 for which the criterion $\phi$ was not satisfied and the $f$-mapped data elements derived from one or more default values 58) are combined using the associative operator $\oplus$ to produce an output 66.

The reduce operation 64 is performed using MPC techniques by two or more worker nodes 2 so that no individual worker node 2 learns the values of the $f$-mapped data elements, or the output 66. The worker nodes 2 that perform the reduce operation 64 may be the same or different to the worker nodes 2 that perform the check, the compression operation 56 and/or the $f$-mapping operation 60.

In the example of FIG. 4, the $f$-mapped data elements #2 and #5 are combined using operator $\oplus$ to form the output 66 (noting that the $f$-mapped default data elements are neutral elements of the operator $\oplus$).

It will be noted that the output 66 is formed from the data elements 52 for which the application of function $f$ to the data element 52 provides a non-neutral element for the operator $\oplus$ (by the definition of criterion $\phi$).

More detailed implementations of the first and second embodiments are described below with reference to a particular MPC framework. Thus, the techniques described herein provide for carrying out a "map" operation on a secret-shared data set. The data elements in the data set are vectors so that the full data set is a matrix with the elements as rows, secret-shared between a number of worker nodes 2 (so either an input node has secret-shared the data set with the worker nodes 2 beforehand, or the data set is the result of a previous multiparty computation). In the first embodiment, the result of the map operation is another secret-shared data set, given as a matrix that contains the result of applying the "map" operation on the data set; and in the second embodiment, the result is a secret-shared vector that contains the result of applying a "map-reduce" operation on the data set.

The techniques described herein can be based on any standard technique for performing multiparty computations between multiple worker nodes 2. To implement the techniques, it is necessary to be able to compute on numbers in a given ring with the primitive operations of addition and multiplication. In the following description, as is standard in the art, multiparty computation algorithms are described as normal algorithms, except that secret-shared values are between brackets, e.g., [x], and operations like [x]·[y] induce a cryptographic protocol between the worker nodes 2 implementing the given operation. Examples of such frameworks are passively secure MPC based on Shamir secret sharing or the SPDZ family of protocols, which are known to those skilled in the art.

Four higher-level operations are also useful for implementing the techniques described herein to allow to access array elements at sensitive indices. These operations are:

[i]←Ix(ix) returns a "secret index" [i]: a representation of array index ix as one or more secret-shared values;

r←IxGet([M]; [i]) returns the row in the secret-shared matrix [M] pointed to by secret index [i];

[M"]←IxSet([M]; [M']; [i]) returns secret shares of matrix [M] with the row pointed to by secret index [i] replaced by the respective row from [M'];

[i']←IxCondUpdate([i], [δ]) returns a secret index pointing to the same index if [δ]=0, and to the next index if [δ]=1.

Multiple ways of implementing these operations based on an existing MPC framework are known in the art and further details are not provided herein. A straightforward adaptation to matrices of the vector indexing techniques from "Design of large scale applications of secure multiparty computation: secure linear programming" by S. De Hoogh, PhD thesis, Eindhoven University of Technology, 2012 has been used, and is set out below in Algorithm 1. An alternative technique is based on adapting the secret vector indexing techniques from "Universally Verifiable Outsourcing and Application to Linear Programming" by S. de Hoogh, B. Schoenmakers, and M. Veeningen, volume 13 of Cryptology and Information Security Series, chapter 10. IOS Press, 2015.

---

Algorithm 1 Secret indexing of indices 1, . . . , n based on arrays

```
1:  function Ix(ix)                           ▷ return secret index representation of ix
2:      return [0], . . . , [0], [1], [0], . . . , [0]    ▷ one at ixth location
3:  function IxGet([M]; Δ)                    ▷ return row of M ∈ 𝔽^{n×k} indicated by Δ
4:      return (Σ_{u=1}^n [Δ_u] · [M_{u,v}])_{v=1,...,k}
5:  function IxSet([M]; [M']; [ix])           ▷ return M ∈ 𝔽^{n×k} with Δth row from M'
6:      return ([M_{u,v}] + [Δ_u] · ([M_{u,v}'] − [M_{u,v}]))_{u=1,...,n;v=1,...,k}
7:  function IxCondUpdate ([Δ]; [δ])          ▷ return secret index repr. of Δ + δ, δ ∈ {0, 1}
8:      return ([Δ_i] + [δ] · ([Δ_{i−1}] − ([Δ_i]))_{i=1,...,n}
```

---

Filtered map procedure—The following section relates to the filtered map procedure as shown in Algorithm 2 below, and provides a specific implementation of the first embodiment above. Algorithm 2 takes as arguments the function $f$ of the mapping, the simplified function g and predicate/criterion $\phi$ specifying when simplified function g can be used, an upper bound N on the number of data elements for which $\phi$ does not hold, and a vector z containing some default value on which $f$ can be applied (but whose results are not used).

---

Algorithm 2 Filtered map with complex function f, simple function g, predicate $\phi$, upper bound N, default value z

```
1:  function FilteredMap(f, g, φ, N, z; [M])
2:      ▷ compute vector [v] containing ones when predicate φ is not
        satisfied
3:      for i = 1, . . . , |[M]| do [v_i] ← 1 − φ([M_i])
4:      ▷ compress dataset [M] to items [M'] not satisfying φ
5:      for i = 1, . . . , N do [M_i'] ← z
6:      [j] ← Ix(0)
7:      for i = 1, . . . , |[M]| do|
8:          [ΔM'] ← ([M_{u,v}'] + [v_i] · ([M_{i,v}] − [M_{u,v}']))_{u=1,...,N;v=1,...,k}
9:          [M'] = IxSet([M']; [ΔM']; [j])
```

-continued

Algorithm 2 Filtered map with complex function f, simple
function g, predicate φ, upper bound N, default value z

```
10:         [j] ← IxCondUpdate([j], [v_i])
11:      ▷ apply f to compressed dataset, g to full dataset
12:         for i = 1, . . . , N do [N_i'] ← f([M_i'])
13:         for i = 1, . . . , |[M]| do [N_i] ← g([M_i])
14:      ▷ decompress results from [N'] back into [N]
15:         [j] ← Ix(0)
16:         for i = 1, . . . , |[M]| do
17:            [c] ← IxGet([N']; [j])
18:            [N_i] ← ([N_{i,j}] + [v_i] · ([c_j] − [N_{i,j}]))_{j=1,...,k}
19:            [j] ← IxCondUpdate([j], [v_i])
20:         return [N]
```

First, a vector [v] is computed that contains a one for each row of [M] where is not satisfied, and a zero where φ is satisfied (line 3 of Algorithm 2).

Next, given matrix [M] and vector [v] the algorithm builds a matrix [M'] with all 1-marked rows of [M] as follows. First, each row of [M'] is initialised to [v] (line 5 of Algorithm 2). Next, [M'] is filled in by going through [M] row-by-row. By the update of secret index [j] in line 10 of Algorithm 2, whenever [$v_i$]=1, [j] points to the row number of [M'] where the current row of [M] is supposed to go. Matrix [ΔM'] is set that is equal to [M'] if [$v_i$] is zero, and consists of N copies of the ith row of [M] if [$v_i$] is one (line 8 of Algorithm 2). The [j]th row of [ΔM'] is then copied to matrix [M'] (line 9 of Algorithm 2). Note that if [$v_i$]=0 then [M'] does not change; otherwise its [j]th row is set to the ith row of [M], as was supposed to happen.

Now, function $f$ is applied to all data elements of the smaller matrix [M'] (line 12 of Algorithm 2) and function g is applied to all elements of [M] (line 13 of Algorithm 2).

Finally, the results of applying $f$ to [M'] are merged with the results of applying g to [M]. The algorithm goes through all rows of [N], where secret index [j] keeps track of which row of [N'] should be written to [N] if [$v_i$]=1 (line 19 of Algorithm 2). The respective row is retrieved from [N'] (line 17 of Algorithm 2); and the ith row of [N] is overwritten with that row if [$v_i$]=1 or kept as-is if [$v_i$]=0 (line 18 of Algorithm 2).

Filtered map-reduce procedure—The following section relates to the filtered map-reduce procedure as shown in Algorithm 3 below, and provides a specific implementation of the second embodiment above. Algorithm 3 takes as arguments the function $f$ of the mapping, predicate/criterion φ, operator ⊕, upper bound N, and a default value z such that $f(z)$ is the neutral element of ⊕.

Algorithm 3 Filtered map-reduce with complex function f, predicate φ,
operator ⊕, upper bound N, default value z

```
1:   function FilteredMapReduce (f, φ, ⊕, N, z; [M])
2:      ▷ for each item in dataset, check whether predicate φ is satisfied
3:         for i = 1, . . . , |[M]| do [v_i] ← 1 − φ([M_i])
4:      ▷ compress dataset [M] to items [M'] not satisfying φ
5:         for i = 1, . . . , N do [M_i'] ← z
6:         [j] ← Ix(0)
7:         for i = 1, . . . , |[M]| do
8:            [ΔM'] ← ([M_{u,v}'] + [v_i] · ([M_{i,v}] − [M_{u,v}']))_{u=1,...,N;v=1,...,k}
9:            [M'] = IxSet([M']; [ΔM']; [j])
10:           [j] ← IxCondUpdate([j], [v_i ≠ 0])
11:     ▷ apply f to compressed dataset
12:        for i = 1, . . . , N do [N_i'] ← f([M_i'])
13:     ▷ Reduce results using ⊕
14:        return [N_1'] ⊕ . . . ⊕ [N_N']
```

The first steps of Algorithm 3, to check φ and obtain a compressed matrix [M'] (lines 2-10 of Algorithm 3), are the same as Algorithm 2 above. In this case, function $f$ is applied to [M'] (line 12 of Algorithm 3) but there is no need to apply g to [M]. Instead, the result is reduced with ⊕ and the result returned (line 14 of Algorithm 3).

Some extensions to the above embodiments and algorithms are set out below:

Obtaining upper bounds—The algorithms above assume that an upper bound N is available on the number of data elements in the data set not satisfying the predicate φ. In some situations, such an upper bound may already be available and predefined. For example, in a case study presented below, the map operation is combined with the disclosure of an aggregated version of the data set, from which an upper bound can be determined. In other situations, an upper bound may not be available but revealing it may not be considered a privacy problem. In this case, after determining the vector [v], its sum Σ[$v_i$] can be opened up by the worker nodes 2 and used as a value for N. As an alternative, the sum can be rounded or perturbed so as not reveal its exact value. In yet other situations, a likely upper bound may be available but it may be violated. In such a case, Σ[$v_i$] can be computed and compared to the supposed upper bound, only leaking the result of that comparison.

Executing g only on mapped items—In the first embodiment above, g is executed on all data elements 22 in the data set 20, whereas the results of applying g are only used for data elements 22 where φ is satisfied. If, apart from an upper bound N on the number of data elements not satisfying φ, there is also a lower bound on the number of data elements not satisfying φ (i.e., an upper bound on the number of items satisfying φ), then it is possible to compute g just on those items at the expense of making the compression/decompression operations 26, 42 more computationally expensive. In cases where g is relatively complex, this can approach can reduce the overall computational burden relative to computing g of every data element 22 in the data set 20.

Block-wise application—For large data sets, instead of applying the above embodiments/algorithms to the whole data set, it may be more efficient to divide the data set into smaller blocks of data elements and apply the map operation to these smaller blocks. This is because the indexing functions used in the compression and decompression operations described above typically scale linearly in both the size of the non-compressed and compressed data sets. However, dividing the original data set into smaller blocks requires upper bounds for each individual block to be known, as opposed to one overall upper bound N. This decreases privacy insofar as these upper bounds are not already known for other reasons. In this sense, providing block-wise processing allows a trade-off between speed and privacy (where a block size of 1 represents the previously-mentioned alternative to reveal predicate φ for each item in the data set).

Flexible application—While the techniques according to the first embodiment described above avoid unnecessary executions of $f$, they do so at the expense of additional computations of g, checking φ, and performing the compression and decompression operations. Hence, if the upper bound N is not small enough, then the techniques described above do not save time. For instance, in the case study described below, the algorithm only saves time if at most five out of ten data elements do not satisfy φ. If the execution times of the various computations are known, then based on the upper bound N a flexible decision can be made as to whether to perform a traditional mapping operation (i.e. applying $f$ to each data element) or a filtered mapping operation. If these execution times are not known beforehand, they can be measured as the computation progresses. In addition, if the upper bound N is zero, then the compression/decompression procedures can be skipped.

Figure 5:
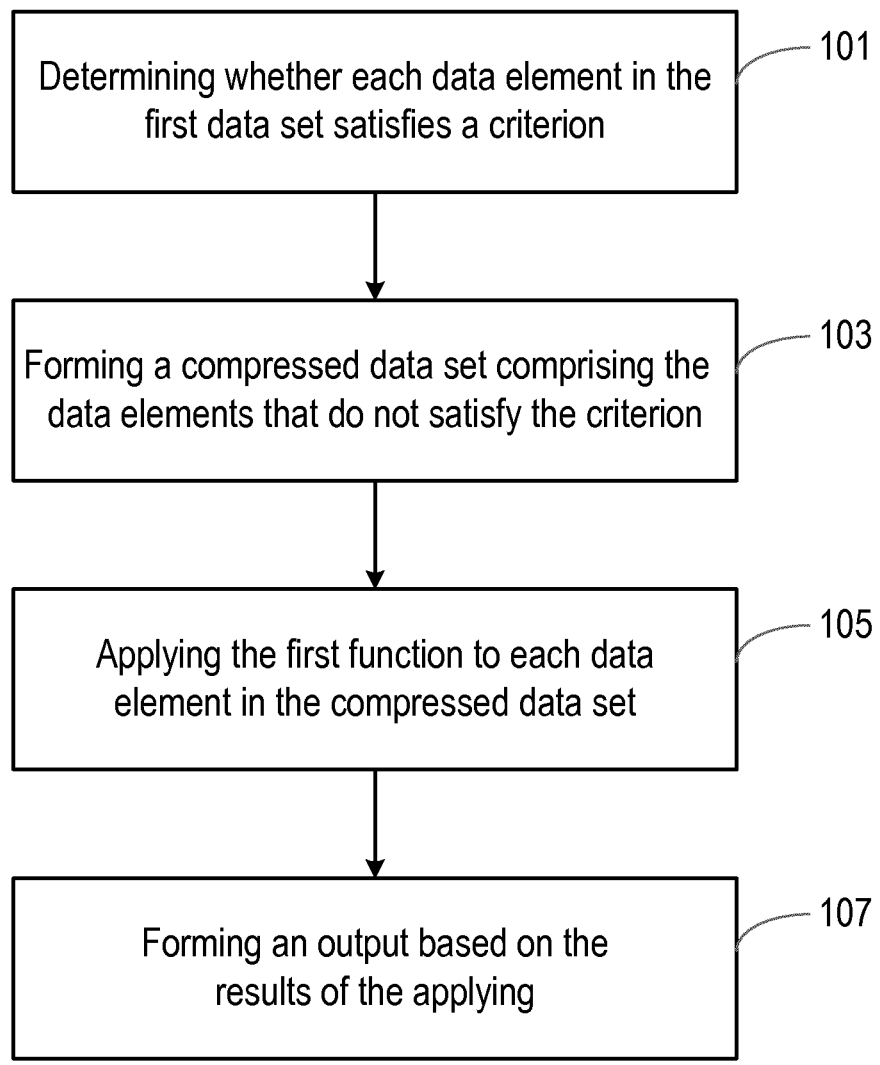
FIG. 5 is a flow chart illustrating a method of applying a first function to each data element in a data set.

The flow chart in FIG. 5 shows a method of applying a first function to each data element in a first data set according to the techniques described herein. The method steps in FIG. 5 are described below in terms of the operations performed in a system 1 by a plurality of worker nodes 2 to apply the first function to data elements in the data set, with each step being performed by two or more worker nodes 2 as a multiparty computation. However, it will be appreciated that each step as illustrated and described below can also be understood as referring to the operations of an individual worker node 2 in the multiparty computation.

In addition, it will be appreciated that any particular worker node 2 in the system 1 may participate in or perform any one or more of the steps shown in FIG. 5. Thus, a particular worker node 2 may only participate in or perform one of the steps in FIG. 5, or a particular worker node 2 may participate in or perform any two or more (consecutive or non-consecutive) steps in FIG. 5, or a particular worker node 2 may participate in or perform all of the steps shown in FIG. 5.

At the start of the method, there is a data set, referred to as a first data set, that comprises a plurality of data elements. The data set can be provided to the system 1 by an input node as a private/secret input, or the data set can belong to one of the worker nodes 2 that is to participate in the method and the worker node 2 can provide the data set as an input to the method and the other worker nodes 2 as a private/secret input. In the method, a function $f$, referred to as a first function, is to be applied to each of the data elements in the data set. For the method to be effective in improving the performance of the mapping of the first function on to the first data set, the first function should be relatively computationally expensive to compute as part of a multiparty computation, there should be a criterion that is easy to check for any particular data element such that, if true, the result of applying the first function to the data element is equal to the result of applying a second function to the data element (where the second function is relatively computationally easy to compute as part of a MPC), and the criterion should hold for a large part of the data set.

In a first step, step 101, it is determined whether each data element in the first data set satisfies the criterion. This check is performed as a MPC by a plurality of worker nodes 2. As noted above, the criterion is satisfied for a particular data element only if (or if and only if) the result of applying the first function to the data element is equal to the result of applying the second function to the data element.

In some embodiments, it can be determined whether the number of data elements in the first data set that do not satisfy the criterion exceeds a first threshold value (also referred to herein as an upper bound). If the number of data elements in the first data set that do not satisfy the criterion does not exceed the first threshold value, then the method can proceed to the next steps in the method and the mapping operation can continue. However, if the number of data elements in the first data set that do not satisfy the criterion does exceed the first threshold value, then the mapping operation can proceed in a conventional way (e.g. by applying the first function to each data element in the data set as part of a MPC), or the method can be stopped. The first threshold value can be set to a value that enables the method of FIG. 5 to provide useful performance gains over the conventional approach of applying the first function to all of the data elements in the data set.

Next, in step 103, a compressed data set is formed that comprises the data elements in the first data set that do not satisfy the criterion. This compression is performed as a MPC by a plurality of worker nodes 2. Thus, the data elements for which the result of applying the first function to the data element is different to the result of applying the second function to the data element are compressed into the compressed data set.

In some embodiments, in addition to the data elements in the first data set that do not satisfy the criterion, one or more data elements corresponding to a default value are included in the compressed data set. In particular, if the number of data elements that do not satisfy the criterion is less than the upper bound (first threshold value), one or more data elements corresponding to the default value can be included in the compressed data set to bring the total number of data elements in the compressed data set up to the upper bound.

In some embodiments, the first threshold value may be determined as described above, and can be determined prior to step 101 being performed, but in other embodiments the first threshold value can be determined based on the total number of data elements in the first data set that do not satisfy the criterion. In this case, to avoid revealing the exact number of data elements in the first data set that do not satisfy the criterion to the worker nodes 2, the total number can be rounded or perturbed in order to generate the first threshold value.

Next, after the compressed data set has been formed, in step 105 the first function is applied to each data element in the compressed data set. This mapping step is performed as a MPC by a plurality of worker nodes 2. In embodiments where the compressed data set includes one or more default values, step 105 comprises applying the first function to each of the data elements in the first data set that do not satisfy the criterion and to each of the one or more data elements corresponding to the default value. It will be appreciated that the worker nodes 2 performing the computation in this step are not aware of which data elements are data elements from the first data set and which data elements are default values.

Finally, in step 107, an output of the mapping is formed based on the results of applying the first function to the data elements in the compressed data set. Again, forming the output is performed as a MPC by a plurality of worker nodes 2.

In some embodiments (corresponding to the filtered map embodiments described above), the output of the method is to be a second data set where each data element of the second data set corresponds to the result of applying the first function to the respective data element in the first data set. Therefore, in some embodiments, the method can further comprise the step of applying the second function to each data element in the first data set using MPC techniques, and the output can be formed in step 107 from the results of step 105 and the results of applying the second function to each data element in the first data set.

Alternatively, in some embodiments the method can further comprise the step of applying the second function to each data element in the first data set that does satisfy the criterion using MPC techniques, and the output can be formed in step 107 from the results of step 105 and the results of applying the second function to the data elements in the first data set that do satisfy the criterion. To implement this step, a second compression step can be performed which compresses the data elements that do satisfy the criterion into a second compressed data set, and the second function can be applied to the second compressed data set. The second compressed data set can include one or more data elements corresponding to one or more default values as described above for the compressed data set formed in step 103. In these embodiments, there can be a second threshold value, and the second compressed data set may only be formed if it is determined that the number of data elements in the first data set that do satisfy the criterion does not exceed the second threshold value.

In either embodiment above, the second data set can be formed so that it comprises data elements corresponding to the results of applying the first function to the data elements in the compressed data set that were in the first data set and that did not satisfy the criterion, and data elements corresponding to the result of applying the second function to the data elements in the first data set for which the criterion was satisfied. Thus, the second data set can have the same number of data elements as the first data set.

In some embodiments, corresponding to the filtered map-reduce embodiments above, the output of the method in step 107 is a combination of the results of applying the first function to the data elements in the compressed data set that were in the first data set and that did not satisfy the criterion. In particular, the combination of the results can be formed using an associative operator (e.g. addition), where the criterion being satisfied by a data element in the first data set means that the result of applying the first function or the second function to the data element is a neutral element for the associative operator (e.g. zero).

As noted above, any worker node 2 in the system 1 may perform any one or more of the steps shown in FIG. 5 or as described above as part of a MPC with one or more other worker nodes 2. As such, a particular worker node 2 may perform, or be configured or adapted to perform, any one or more of steps 101, 103, 105, 107 and the steps described above.

Exemplary implementation and evaluation of the filtered map-reduce technique—This section presents a case study that shows how the above techniques improve the performance of a map operation (specifically, a map-reduce operation). The case study relates to a Kaplan-Meier survival analysis.

The Kaplan-Meier estimator is an estimation of the survival function (i.e., the probability that a patient survives beyond a specified time) based on lifetime data. The estimated probability $p_i$ at a given time i is given as $p_i = \pi_{j \leq i}(n_j - d_j)/n_j$, where $n_j$ is the number of patients still in the study just before time j and $d_j$ is the number of deaths at time j; the product is over all time points where a death occurred (although it should be noted that $n_j$ decreases not just by deaths but also by people dropping out of the study for other reasons).

A simple statistical test to decide if two Kaplan-Meier estimates are statistically different is the so-called Mantel-Haenzel logrank test. For instance, this is the test performed by R's survdiff call (this is the "survdiff" command of the R software environment for statistical computing and graphics (www.r-project.org). Given values $n_{j,1}$, $n_{j,2}$, $d_{j,1}$, $d_{j,2}$ at each time point t, define:

$$E_{j,1} = \frac{(d_{j,1} + d_{j,2}) \cdot n_{j,1}}{n_{j,1} + n_{j,2}};$$

$$V_j = \frac{n_{j,1} n_{j,2}(d_{j,1} + d_{j,2})(n_{j,1} + n_{j,2} - d_{j,1} - d_{j,2})}{(n_{j,1} + n_{j,2})^2 \cdot (n_{j,1} + n_{j,2} - 1)};$$

-continued $$X = \frac{\sum_j E_{j,1} - \sum_j d_{j,1}}{\sum_j V_j}.$$

The null hypothesis, i.e., the hypothesis that the two curves represent the same underlying survival function, corresponds to $X \approx X_1^2$. This null hypothesis is rejected (i.e., the curves are different) if $1-cdf(X) > \alpha$, where cdf is the cumulative density function of the $X_1^2$ distribution and, e.g., $\alpha = 0.05$.

It should be noted that the computation of this statistical test can be performed using a map-reduce operation. Namely, each tuple $(n_{j,1}, n_{j,2}, d_{j,1}, d_{j,2})$ can be mapped to $(E_{j,1}, V_j, d_{j,1})$ and these values are reduced using point-wise summation to obtain $(\Sigma E_{j,1}, \Sigma V_j, \Sigma d_{j,1})$; and these values are used to compute X. Moreover, it should be noted that, under the easy to establish criterion $\phi := (d_{j,1}, d_{j,2}) = (0, 0)$, it is given that $(E_{j,1}, V_j, d_{j,1}) = (0; 0; 0)$ (the neutral element under point-wise summation), so the conditions under which the filtered map-reduce can be applied are satisfied. As default value, $z = n_{j,1}, n_{j,2}, d_{j,1}, d_{j,2} = (1, 1, 0, 0)$ can be used.

Anonymized Survival Graph and Upper Bounds

In the case of Kaplan-Meier, the values $n_j$ and $d_j$ at each time are non-anonymised data. This data can be anonymised by merging different time points. In particular, a block of N consecutive time points $(n_i d_i)_{i=1, \ldots, N}$ are anonymised to one time point (n; d) with $n = n_1$, $d = \Sigma d_i$.

This anonymised survival data enables an upper bound N to be established on the number of time points for which the above $\phi$ does not hold. Namely, given anonymised time points (n, d), (n'; d'), the number of points in the block corresponding to (n; d) is at most n−n': the number of people that dropped out during that time interval. Hence, each block has an upper bound, enabling block-wise application of the map-reduce algorithm as discussed above.

The details of performing the statistical test on Kaplan-Meier survival data are now presented. Apart from the basic MPC framework discussed above, it is also assumed that the following are available:

a function $[c] \leftarrow Div([a], [b], L)$ that, given secret-shared [a] and [b], returns secret-shared [c] such that $a/b \approx c \cdot 2^{-L}$, i.e., c is a fixed-point representation of a=b with L bits precision. Such an algorithm can be obtained by adaptation of division algorithms from "Design of large scale applications of secure multiparty computation: secure linear programming" referenced above, or "High-performance secure multi-party computation for data mining applications" by D. Bogdanov, M. Niitsoo, T. Toft and J. Willemson, *Int. J. Inf. Secur.*, 11(6):403-418, November 2012. By convention, $[a]^1$, $[a]^2$ are secret-shares representing a fixed-point value with precision BITS_1 and BITS_2 respectively defined by the application.

An operator $[b] \leftarrow [a] \gg L$ that shifts secret-shared value a to the right by L bits, as also found in the above two references.

A function $[fl] \leftarrow eqz([x])$ that sets $fl=1$ if $x=0$, and $fl=0$ otherwise. A protocol to implement this is described in the first reference above.

Given these primitives, the row-wise operation for the Kaplan-Meier test can be implemented, i.e., the function $f$ for the map-reduce operation, as shown in Algorithm 4 below. The algorithm to evaluate ϕ, i.e. the function that computes which rows do not contribute to the test, is shown in Algorithm 5 below.

Algorithm 4 Log test inner loop

Require: $[d_{i,1}]$, $[d_{i,2}]$, $[n_{i,1}]$, $[n_{i,2}]$ survival data at time point i
Ensure: $([e_j]^1, [v_i]^1, [d_i])$ contributions to $\Sigma_j E_{j,1}$, $\Sigma_j V_j$, $\Sigma_j d_{j,1}$ for test statistic X
1:    function f($[d_{i,1}]$, $[d_{i,2}]$, $[n_{i,1}]$, $[n_{i,2}]$)
2:        [ac] ← $[d_{i,1}]$ + $[d_{i,2}]$
3:        [bd] ← $[n_{i,1}]$ + $[n_{i,2}]$
4:        $[frc]^1$ ← Div([ac]; [bd]; BITS_1)
5:        $[e_j]^1$ ← $[frc]^1 \cdot [n_{i,1}]$
6:        [vn] ← $[n_{i,1}] \cdot [n_{i,2}] \cdot$ [ac] $\cdot$ ([bd] − [ac])
7:        [vd] ← [bd] · [bd] · ([bd] − 1)
8:        $[v_i]^1$ ← Div([vn]; [vd]; BITS_1)
9:        return $([e_j]^1, [v_i]^1, [d_i])$ Algorithm 5 Log test criterion Require: $[d_{i,1}]$, $[d_{i,2}]$, $[n_{i,1}]$, $[n_{i,2}]$ survival data at time point i
Ensure:[fl] = 1 if time point does not provide contribution to test statistic
1:    function ϕ($[d_{i,1}]$, $[d_{i,2}]$, $[n_{i,1}]$, $[n_{i,2}]$)
2:        [fl] ← eqz($[d_{i,1}] + [d_{i,2}]$)
3:        return [fl]

The overall algorithm for performing the logrank test is shown in Algorithm 6 below.

Algorithm 6 Logrank test on survival curves, using filtered map-reduce

Require: [n], [d] t-by-2 matrices of lifetime data for two populations; S step size
Ensure: N, D anonymized data, p p-value for hypothesis of same survival function
1:    for j ← 1, . . . , ⌈t/S⌉ + 1 do   ▷ generate annoymized data
2:        b ← (j − 1)S + 1; e ← jS
3:    ▷ by convention, [n] is extended with copies of its last row and [d] by zeros
4:        $N_{j,1}$ = Open($[n_{b,1}]$) $N_{j,2}$ = Open($[n_{b,2}]$)
5:        $D_{j,1}$ = Open($\Sigma_{i=b}^{e}[d_{i,1}]$); $D_{j,2}$ = Open($\Sigma_{i=b}^{e}[d_{i,2}]$)
6:    for j ← 1, . . . , ⌈t/S⌉ do   ▷ compute conributions for each block
7:        b ← (j − 1)S + 1; e ← jS; N ← $N_{j,1}$ + $N_{j,2}$ − $N_{j+1,1}$ − $N_{j+1,2}$
8:        [M] ← $\{[d_{i,1}], [d_{i,2}], [n_{i,1}], [n_{i,2}]\}_{i=b,...,e}$
9:        $([e_j]^1, [v_j]^1, [d_j'])$ FilteredMapReduce(f, ϕ, +, N, (0, 0, 1, 1); [M])
10:    [dtot] ← $\Sigma_{j=1}^{\lceil t/S \rceil}[d_j']$; $[dtot]^1$ ← [dtot] << BITS_1
11:    $[etot]^1$ ← $\Sigma_{j=1}^{\lceil t/S \rceil}[e_j]^1$; $[vtot]^1$ ← $\Sigma_{j=1}^{\lceil t/S \rceil}[v_j]^1$
12:    $[dmi]^1$ ← $[dtot]^1 - [vtot]^1$
13:    $[chi0]^2$ ← Div($[dmi]^1$; $[vtot]^1$; BITS_2)
14:    $[chi]^{12}$ ← $[chi0]^2 \cdot [dmi]^1$
15:    $[chi]^1$ ← $[chi]^{12}$ >> BITS_2
16:    $chi^1$ ← Open($[chi]^1$)
17:    p ← 1 − $cdf_{\chi_1^2}(chi^1 \cdot 2^{-BITS\_1})$
18:    return N, D, p First, as discussed above, anonymised survival data (lines 1-5 of Algorithm 6) is computed. For each S-sized block the number of participants from the first time point are taken (line 4 of Algorithm 6) and the sum of deaths from all time points (line 5 of Algorithm 6). Then, for each block, the upper bound on the number of events is computed (line 7 of Algorithm 6) and the FilteredMapReduce function is applied to obtain the contributions of those time points to the overall test statistic (line 9 of Algorithm 6). This information is summed together, and from that the test statistic is computed (lines 10-17 of Algorithm 6).

A prototype implementation of the above system has been constructed. The multiparty computation framework has been instantiated using FRESCO (the Framework for Efficient Secure Computation, found at https://github.com/aicis/fresco) using the FRESCO SPDZ back-end for two parties. This framework provides the MPC functionality required for the techniques described herein, as discussed above. Concerning the additional MPC functionality required for Kaplan-Meier as discussed above, the division protocol from "High-performance secure multi-party computation for data mining applications" is adapted to perform right-shifts after every iteration so that it works for smaller moduli; for right-shifting and zero testing the protocols provided by FRESCO are used. Constants BITS_1=23, BITS_1=30 were used.

As a performance metric, an estimate of the pre-processing time required for the computation is used. The SPDZ protocol used, while performing a computation, consumes certain pre-processed data (in particular, so-called multiplication triples and pre-shared random bits) that need to be generated prior to performing the computation. With state-of-the-art tools, the effort for pre-processing is one or more orders of magnitude more than the effort for the computation itself, therefore, pre-processing effort is a realistic measure of overall effort. To estimate pre-processing time, the amount of pre-processed data needed during the computation is tracked; and this is multiplied with the cost per pre-processed item, which is obtained by simulating both pre-processing parties in one virtual machine on a conventional laptop.

Figure 6:
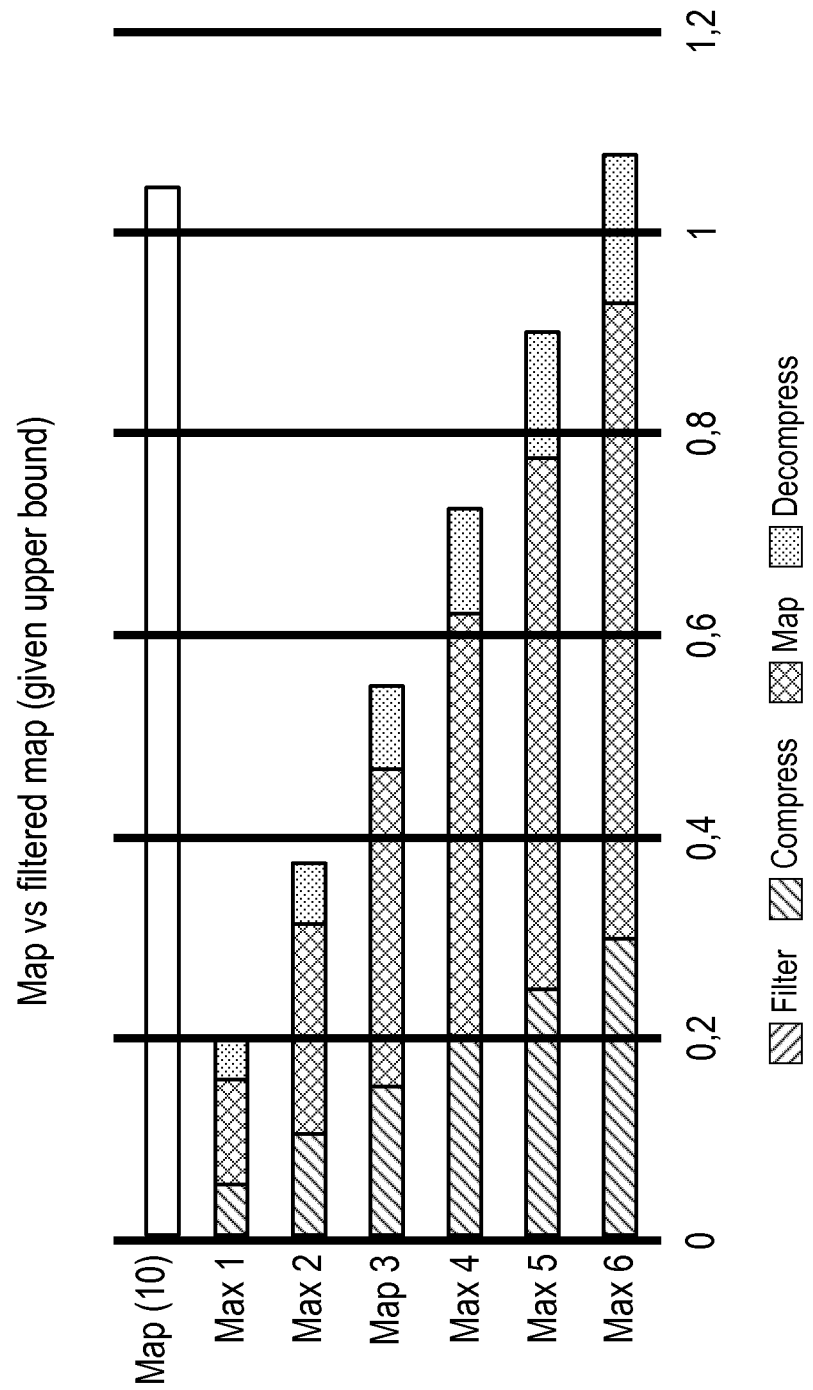
FIG. 6 is a graph illustrating the performance of a normal map procedure versus the filtered map procedure for different values of an upper bound according to the techniques described herein.

The graph in FIG. 6 illustrates the performance of a normal map procedure versus the filtered map procedure for the Kaplan-Meier case study for different values of an upper bound N according to the techniques described herein.

Assuming there is a list of ten time points for which an upper bound is available (for instance, because anonymised data is released in groups of ten time points), the graph compares the normal map operation (shown in the top row) with the filtered map according to the techniques described herein for various values of the upper bound N. As can be seen, applying the filter (i.e. determining which rows do not contribute to the final result using ϕ) takes virtually no time (shown by the first section of each row). Each row then shows, from left to right, the time needed for the compression operation, the time needed for mapping f on to the compressed list, and the time need for the decompression operation, and it can be seen that the time taken for each operation increases linearly with increases in the upper bound.

When the upper bound N is 6 (the bottom row in FIG. 6), the overhead of compressing and decompressing becomes so large that it is faster to perform a direct mapping of $f$ on to all of the data elements. If decompression is not needed, the compression and mapping of $f$ on to the compressed data set is still cheaper (quicker) for an upper bound N=6 but not for upper bound N=7 (not shown in FIG. 6). The overall result on the overall Kaplan-Meier computation on a representative data set is a time decrease of 51% on the map-reduce operation, which is the bulk of the overall computation.

There is therefore provided improved techniques for applying a first function to each data element in a data set that addresses one or more of the issues with conventional techniques. Generally, the need for multiparty computation arises in many circumstances, for example where multiple mutually distrusting parties want to enable joint analysis on their data sets. Applying a map operation on a list of data elements is a general concept that occurs in many analytics algorithms. The techniques described herein are to be used with data sets for which there is a large number of "trivial" data elements for which the map operation is easy (i.e. where $\phi$ is satisfied). The Kaplan-Meier Statistical Test is one such example, but those skilled in the art will be aware of other data sets/tests that the techniques described herein can be applied to.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method of applying a first function to each data element in a first data set comprising a plurality of data elements, the method comprising:
    (i) determining, as a multiparty computation by a plurality of worker nodes, whether each data element in the first data set satisfies a criterion, wherein the criterion is satisfied only if the result of applying the first function to the data element is equal to the result of applying a second function to the data element, and wherein applying the first function is more computationally expensive than applying the second function;
    (ii) forming, as a multiparty computation by the plurality of worker nodes, a compressed data set comprising the data elements in the first data set that do not satisfy the criterion and, if an upper bound of the compressed data set is not met by the data elements in the first data set that do not satisfy the criterion, one or more data elements corresponding to a default value;
    (iii) applying, as a multiparty computation by the plurality of worker nodes, the first function to each data element in the compressed data set, wherein the plurality of worker nodes applying the first function are not aware of which data elements of the compressed data set are from the first data set and which are default values; and
    (iv) forming, as a multiparty computation by the plurality of worker nodes, an output based on the results of step (iii);
    wherein steps (i)-(iv) are performed using multiparty computation techniques.

2. The computer-implemented method as claimed in claim 1 wherein the method further comprises the step of:
    determining whether a number of the data elements in the first data set that do not satisfy the criterion exceeds a first threshold value; and
    performing steps (ii), (iii) and (iv) if the number of the data elements in the first data set that do not satisfy the criterion does not exceed the first threshold value.

3. The computer-implemented method as claimed in claim 2, wherein the compressed data set comprises a total number of the data elements equal to the first threshold value.

4. The computer-implemented method as claimed in claim 1, wherein the method further comprises the step of:
    determining a first threshold value based on the number of the data elements in the first data set that do not satisfy the criterion.

5. The computer-implemented method as claimed in claim 1 wherein the method further comprises the step of:
    (v) applying the second function to each of the data elements in the first data set using multiparty computation techniques; and
    wherein the step of forming an output comprises forming an output based on the results of steps (iii) and (v), wherein the step of forming an output based on the results of steps (iii) and (v) comprises:
    forming a second data set from the results of step (iii) and step (v), wherein the second data set comprises one or more of the data elements corresponding to the results of applying the first function to the data elements in the compressed data set that were in the first data set and that did not satisfy the criterion, and one or more of the data elements corresponding to the result of applying the second function to the data elements in the first data set for which the criterion was satisfied.

6. The computer-implemented method as claimed in claim 5, wherein the second data set has a number of the data elements equal to a number of data elements in the first data set.

7. The computer-implemented method as claimed in claim 5, wherein the method further comprises:
    applying the second function to each of the data elements in the first data set that does satisfy the criterion using multiparty computation techniques if a number of the data elements in the first data set that do satisfy the criterion does not exceed a second threshold value.

8. The computer-implemented method as claimed in claim 1, wherein the step of forming an output based on the results of step (iii) comprises:
    forming the output by using an associative operator to combine the results of applying the first function to the data elements in the compressed data set that were in the first data set and that did not satisfy the criterion.

9. The computer-implemented method as claimed in claim 8, wherein the criterion is such that the criterion is satisfied only if the result of applying the first function to the data element and the result of applying the second function to the data element is a neutral element for the associative operator.

10. The computer-implemented method as claimed in claim 1, wherein whether each data element in the first data set satisfies the criterion is determined using a multiparty computation by the plurality of worker nodes such that no individual worker node knows which data elements of the first data set satisfy or do not satisfy the criterion.

11. A system for applying a first function to each data element in a first data set comprising a plurality of data elements, the system comprising:
   a plurality of worker nodes, each worker node being an electronic device comprising a memory unit and a processing unit, wherein the plurality of worker nodes are configured to use multiparty computation techniques to:
      determine whether each data element in the first data set satisfies a criterion, wherein the criterion is satisfied only if the result of applying the first function to the data element is equal to the result of applying a second function to the data element, wherein applying the first function is more computationally expensive than applying the second function;
      form a compressed data set comprising the data elements in the first data set that do not satisfy the criterion and, if an upper bound of the compressed data set is not met by the data elements in the first data set that do not satisfy the criterion, one or more data elements corresponding to a default value;
      apply the first function to each of the data elements in the compressed data set, wherein the plurality of worker nodes applying the first function are not aware of which data elements of the compressed data set are from the first data set and which are default values; and
      form an output based on the results of applying the first function to each of the data elements in the compressed data set.

12. The system as claimed in claim 11, wherein the plurality of worker nodes are further configured to:
   determine whether a number of the data elements in the first data set that do not satisfy the criterion exceeds a first threshold value; and
   perform the forming a compressed data set, applying the first function and forming an output if the number of the data elements in the first data set that do not satisfy the criterion does not exceed the first threshold value.

13. The system as claimed in claim 12, wherein the compressed data set comprises a total number of the data elements equal to the first threshold value.

14. The system as claimed in claim 11, wherein the plurality of worker nodes are configured to:
   determine a first threshold value based on the number of the data elements in the first data set that do not satisfy the criterion.

15. The system as claimed in claim 11, wherein the plurality of worker nodes are further configured to:
   apply the second function to each of the data elements in the first data set using multiparty computation techniques; and
   wherein the plurality of worker nodes are configured to forming an output based on the results of applying the first function and applying the second function.

16. The system as claimed in claim 15, wherein the plurality of worker nodes are configured to form an output based on the results of applying the first function and applying the second function by:
   forming a second data set from the results of applying the first function and applying the second function, wherein the second data set comprises data elements corresponding to the results of applying the first function to the data elements in the compressed data set that were in the first data set and that did not satisfy the criterion, and data elements corresponding to the result of applying the second function to the data elements in the first data set for which the criterion was satisfied.

17. The system as claimed in any of claim 15, wherein the plurality of worker nodes are configured to:
   apply the second function to each of the data elements in the first data set that does satisfy the criterion using multiparty computation techniques if a number of the data elements in the first data set that do satisfy the criterion does not exceed a second threshold value.

18. The system as claimed in claim 16, wherein the second data set a number of the data elements equal to a number of data elements in the first data set.

19. The system as claimed in claim 11, wherein the plurality of worker nodes are configured to form an output based on the results of comprises applying the first function by:
   forming the output by using an associative operator to combine the results of applying the first function to the data elements in the compressed data set that were in the first data set and that did not satisfy the criterion.

20. The system as claimed in claim 19, wherein the criterion is such that the criterion is satisfied only if the result of applying the first function to the data element and the result of applying the second function to the data element is a neutral element for the associative operator.

21. The system as claimed in claim 11, wherein the plurality of worker nodes are configured to determine whether each data element in the first data set satisfies the criterion using multiparty computation techniques such that no individual worker node knows which data elements of the first data set satisfy or do not satisfy the criterion.

22. A worker node that is an electronic device comprising a memory unit and a processing unit that are adapted for use in applying a first function to each data element in a first data set comprising a plurality of data elements, wherein the worker node is configured to use one or more multiparty computation techniques with at least one other worker node to:
   determine whether each data element in the first data set satisfies a criterion, wherein the criterion is satisfied only if the result of applying the first function to the data element is equal to the result of applying a second function to the data element, and wherein applying the first function is more computationally expensive than applying the second function;
   form a compressed data set comprising the data elements in the first data set that do not satisfy the criterion and, if an upper bound of the compressed data set is not met by the elements in the first data set that do not satisfy the criterion, one or more data elements corresponding to a default value;
   apply the first function to each of the data elements in the compressed data set, wherein the worker nodes applying the first function are not aware of which data elements of the compressed data set are from the first data set and which are default values; and
   form an output based on the result of applying the first function to each of the data elements in the compressed data set.

23. The worker node as claimed in claim 22, wherein the worker node is configured to use one or more multiparty computation techniques with at least one other worker node to determine whether each data element in the first data set satisfies the criterion such that no individual worker node knows which data elements in the first data set satisfy or do not satisfy the criterion.

\* \* \* \* \*